Feb. 12, 1924.
F. V. PEPPER
1,483,374
TIRE VALVE
Filed March 7, 1922
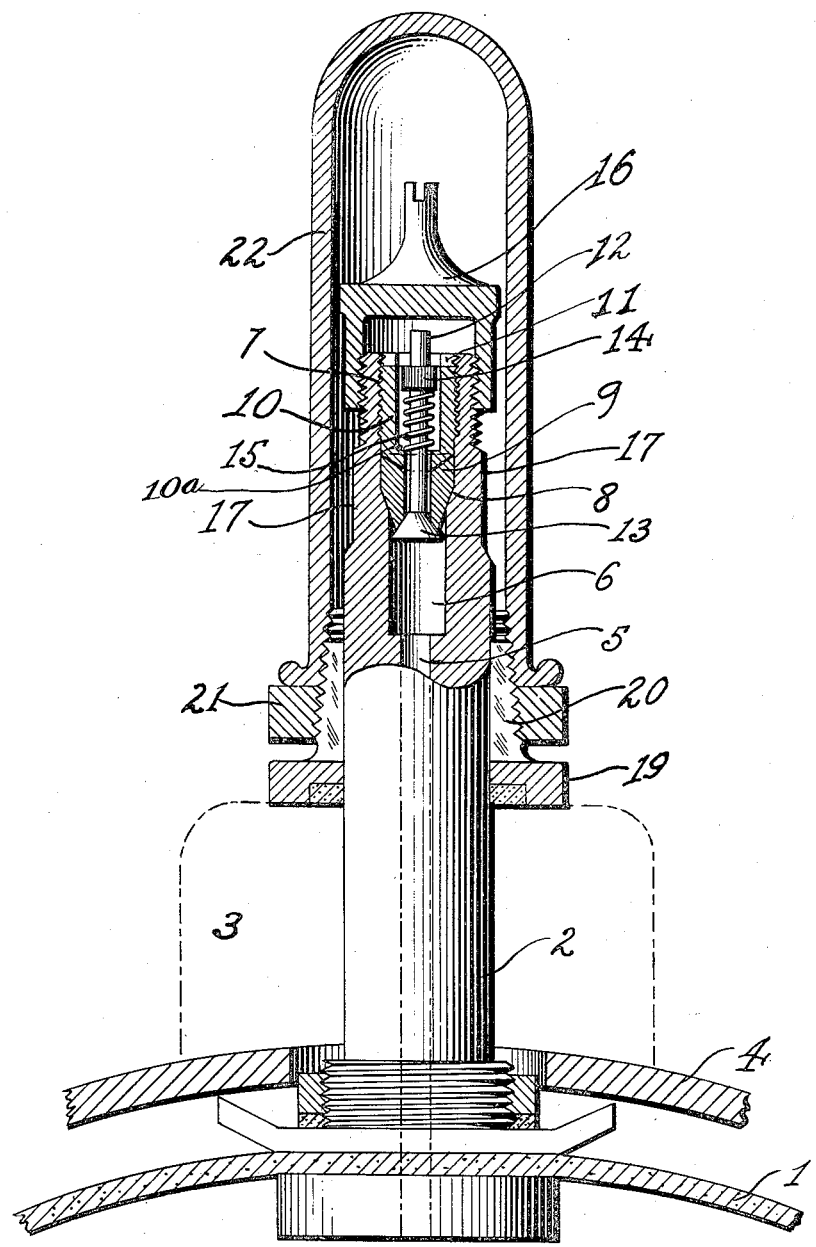
INVENTOR.
Frederick V. Pepper
BY
ATTORNEY.

Patented Feb. 12, 1924.

1,483,374

UNITED STATES PATENT OFFICE.

FREDERICK V. PEPPER, OF LOS ANGELES, CALIFORNIA.

TIRE VALVE.

Application filed March 7, 1922. Serial No. 541,752.

*To all whom it may concern:*

Be it known that I, FREDERICK V. PEPPER, a citizen of the United States, residing at the city of Los Angeles, county of Los Angeles, State of California, have invented new and useful Improvements in Tire Valves, of which the following is a specification.

My invention relates to a valve for the inner tube of a pneumatic tire, and the object thereof is to provide means to quickly attach or detach the valve stem from the felloe of the wheel. A further object is to provide a valve that will prevent the air from leaking out of the tube.

My invention is illustrated in the accompanying drawing, forming a part of this application which is an enlarged view, partly in elevation and partly in longitudinal central section of my tire valve.

Referring to the drawings, 1 is a fragment of the inner tube of a pneumatic tire, to which the stem 2 of my tire valve is secured in the usual manner. The felloe 3 is shown in dotted lines and contacts with the rim 4. Stem 2 has a longitudinal central channel 5 therein, the inner end of which opens into the inner tube, and the outer end opens into the valve chamber 6. The outer end of the valve chamber is enlarged and the inner surface of the outer portions of the walls of the stem are threaded as shown at 7. The side walls of the valve chamber are parallel except at the point of juncture of the larger and smaller portions of the chamber, which occurs at near the center thereof. At this point the walls slant and form a seat 8 for a pierced plug 9 which is preferably of rubber. The outer end of plug 9 preferably tapers outwardly. A tubular expander 10 screws into the outer end of stem 2, and preferably has the inner end tapered to fit into the outer end of plug 9, whereby the outer end of the plug may be expanded, and thereby make an air tight contact with the walls of the stem. The outer end of expander 10 has a kerf for the reception of a suitable tool to properly position the expander. Projecting through plug 9 and expander 10 is a stem 12, on the inner end of which is a valve 13 which is normally positioned to engage the inner end of plug 9, and prevent air passing therethrough. Near the outer end of stem 12 is a collar 14. A spring 15 is coiled around stem 12 between collar 14 and shoulder 10ª of expander 10, and normally holds valve 13 seated on the inner end of plug 9. The outer surface of the outer end of stem 2 is exteriorly threaded for the reception of the safety cap 16, which screws thereon to hold the air from escaping if valve 13 or plug 9 should become defective and let the air leak past. Just below the safety cap the opposite sides of stem 2 are flattened at 17 to hold a tool to prevent the stem from turning when expander 10 is positioned. To hold stem 2 firmly positioned in the felloe 18 shown in dotted lines, I use a slip nut having a knurled head 19 and a slender slitted body 20, the exterior surface of which is tapered and threaded. A binding nut 21 screws upon the body and holds it in frictional engagement with stem 2, thereby holding the stem firmly positioned. A dust cap 22 is screwed upon the outer end of body 20 and acts as a lock nut for nut 21. By this construction it will be seen that when it is necessary to change tires by loosening the dust cap and the binding nut, the slip nut can be removed from stem 2, thereby permitting the tire to be removed. It will be seen that if desired valve 13 and connected parts can be removed by unscrewing the expander, and new parts quickly put in.

Having described my invention, I claim:

1. The combination of a tire valve having a stem; with a slip nut having a slitted body whose exterior is tapered and threaded and is adapted to be slid upon said stem; a binding nut adapted to screw upon said body and cause said body to frictionally engage the stem, said slip nut engaging the felloe when positioned for use; and a dust cap having interior threads adapted to screw upon said body and act as a nut lock to said binding nut.

2. In a tire valve means to secure the stem thereof in a felloe comprising a slip nut having a slitted body whose exterior is tapered and threaded and a binding nut adapted to screw upon said body and cause said body to frictionally engage the stem, said slip nut engaging the felloe when positioned for use, and projecting through the binding nut, said projecting part being adapted to receive and hold a dust cap adapted to act as a nut lock.

In witness that I claim the foregoing, I have hereunto subscribed my name this 25th day of Feby., 1922.

FREDERICK V. PEPPER.

Witnesses:
CHARLES W. CODY,
WM. B. LARKIN.